United States Patent
Kim et al.

(10) Patent No.: US 11,922,225 B1
(45) Date of Patent: Mar. 5, 2024

(54) CLUSTER NODE RECOMMENDATION SYSTEM

(71) Applicant: STRATO CO., LTD., Seoul (KR)

(72) Inventors: Hyeong-Doo Kim, Yongin-si (KR); Ho-Chul Lee, Suwon-si (KR); Sun-Kyu Park, Seoul (KR); Nam-Kyu Park, Seoul (KR); Yong-Min Kwon, Bucheon-si (KR)

(73) Assignee: STRATO CO., LTD., Seoul (KR)

( * ) Notice: Subject to any disclaimer, the term of this patent is extended or adjusted under 35 U.S.C. 154(b) by 0 days.

(21) Appl. No.: 18/499,901

(22) Filed: Nov. 1, 2023

(30) Foreign Application Priority Data

Dec. 14, 2022 (KR) .......................... 10-2022-0174915

(51) Int. Cl.
*G06F 9/50* (2006.01)
(52) U.S. Cl.
CPC .......... *G06F 9/5077* (2013.01); *G06F 9/5027* (2013.01)
(58) Field of Classification Search
None
See application file for complete search history.

(56) References Cited

U.S. PATENT DOCUMENTS

| | | | | |
|---|---|---|---|---|
| 9,122,562 | B1* | 9/2015 | Stickle | G06F 9/5077 |
| 10,402,227 | B1* | 9/2019 | Kinney, Jr. | G06F 9/5077 |
| 10,509,683 | B2* | 12/2019 | Furman | G06F 9/5061 |
| 11,507,430 | B2* | 11/2022 | Subramanian | G06N 3/04 |
| 11,720,823 | B2* | 8/2023 | Wetherbee | G06N 20/10 |
| | | | | 706/11 |
| 2020/0241926 | A1* | 7/2020 | Guim Bernat | G06F 9/5044 |
| 2022/0180178 | A1* | 6/2022 | Tasinga | G06F 9/5011 |
| 2022/0335302 | A1* | 10/2022 | Banipal | G06N 3/088 |
| 2023/0029888 | A1* | 2/2023 | Wang | G06F 16/214 |

FOREIGN PATENT DOCUMENTS

| | | |
|---|---|---|
| KR | 10-2015-0108230 A | 9/2015 |
| KR | 10-1977536 B1 | 5/2019 |
| KR | 10-2021-0129256 A | 10/2021 |
| KR | 10-2022-0019924 A | 2/2022 |
| KR | 10-2022-0118875 A | 8/2022 |

OTHER PUBLICATIONS

Chen et al.; "Enhanced Learning Resource Recommendation Based on Online Learning Style Model"; Tsinghua Science and Technology; (http://creativecommons.org/licenses/by/4.0/); Jun. 2020; (Chen_2019.pdf; pp. 348-356) (Year: 2020).*

* cited by examiner

*Primary Examiner* — Hiren P Patel
(74) *Attorney, Agent, or Firm* — Stein IP, LLC

(57) ABSTRACT

Provided is a cluster node recommendation system. A method of controlling the cluster node recommendation system includes: inputting user selection information from a user, the user selection information including at least one of a cloud vendor, an Information Technology (IT) resource size, and a free resource size; checking resource requirements of a designated application; outputting a node configuration by inputting the input user selection information and the checked resource requirements of the application to an artificial intelligence module; verifying validity by arranging a container in which the application is executed, in the output node configuration; and providing a final node configuration in which validity verification is made, to the user.

3 Claims, 2 Drawing Sheets

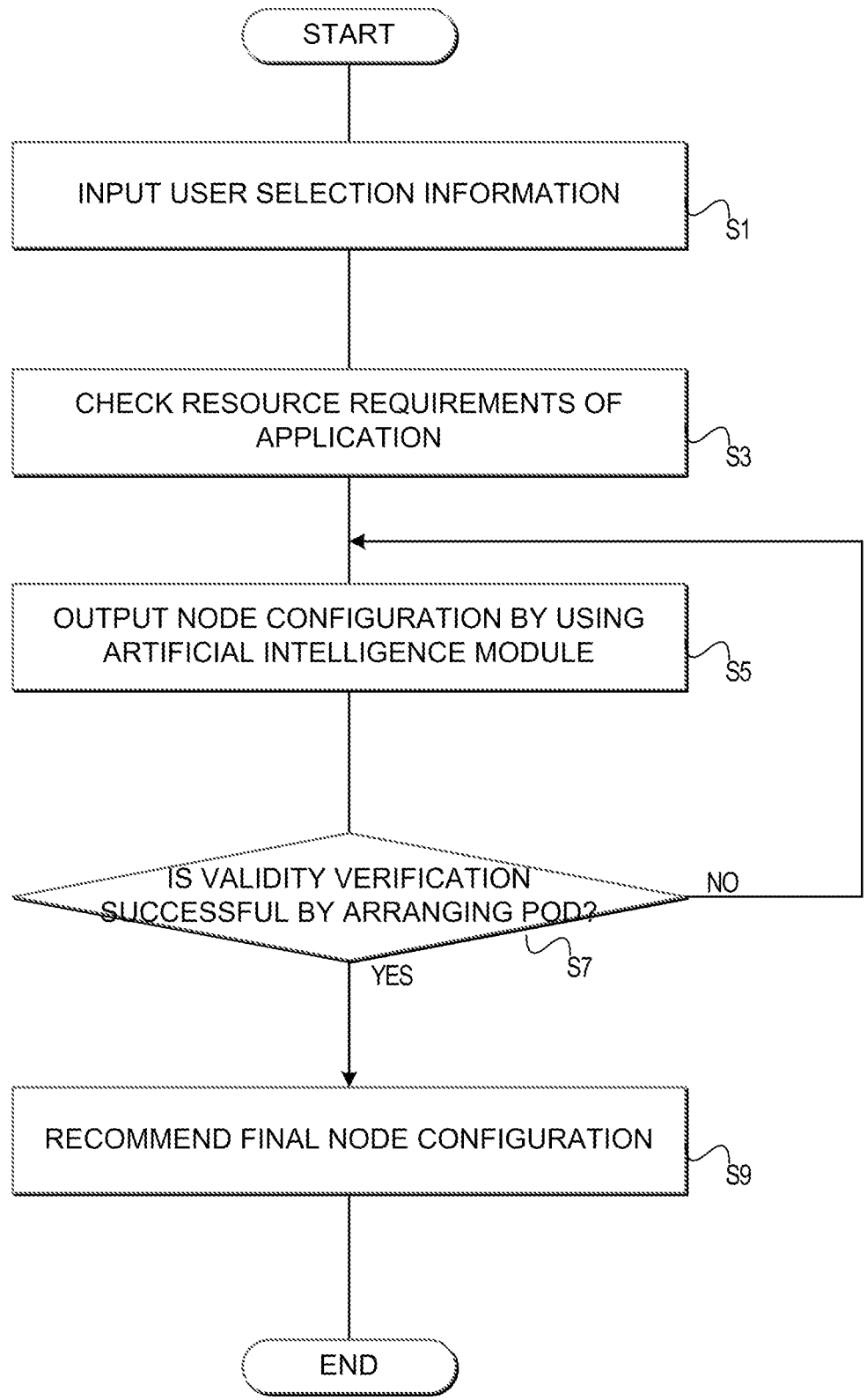

CLUSTER NODE RECOMMENDATION SYSTEM

CROSS-REFERENCE TO RELATED APPLICATIONS

This application claims the benefit of Korean Application No. 10-2022-0174915, filed Dec. 14, 2022, in the Korean Intellectual Property Office. All disclosures of the document named above are incorporated herein by reference.

Technical Field

The present invention relates to a cluster node recommendation system, and more particularly, to a system that recommends a cluster node satisfying resource requirements of an application.

BACKGROUND ART

Currently, the use of virtual resources is increasing due to the rapid expansion of cloud-based Information Technology (IT) environments.

In addition, cloud usage is increasing not only in the IT field but also in various work environments. Thus, cluster creation (for example, Kubernetes cluster creation) is being created without analyzing the resource requirements of an application to be used.

In particular, when configuring a Kubernetes cluster for service operation, node resources have been calculated based on engineer experience. This method is a resource estimation method determined by people when creating resources, so there is no choice but to rely on people with experience in existing tasks. Due to the structure, optimum conclusion is not always drawn, and the method is not an optimized resource inference method, so that service quality is reduced or cost is wasted due to lack of hardware (H/W) resources.

Thus, it is required to introduce a system that more accurately recommends an optimum node configuration depending on an application.

Prior-Art Document

Korean Patent Laid-open Publication No. 10-2022-0019924

DISCLOSURE OF THE INVENTION

The present invention provides a system that automatically recommends an optimum node configuration depending an application and a method of controlling the system.

According to an aspect of the present invention, there is provided a method of controlling a cluster node recommendation system, the method including: inputting user selection information from a user, the user selection information including at least one of a cloud vendor, an Information Technology (IT) resource size, and a free resource size; checking resource requirements of a designated application; outputting a node configuration by inputting the input user selection information and the checked resource requirements of the application to an artificial intelligence module; verifying validity by arranging a container in which the application is executed, in the output node configuration; and providing a final node configuration in which validity verification is made, to the user.

According to another aspect of the present invention, there is provided a cluster node recommendation system including: an input unit to which user selection information is input from a user, the user selection information including at least one of a cloud vendor, an Information Technology (IT) resource size, and a free resource size; a resource requirement checking unit configured to check resource requirements of a designated application; an artificial intelligence module to which the user selection information input to the input unit and the resource requirements of the application checked by the resource requirement checking unit are input and which outputs a node configuration; a validity verification unit configured to verify validity by arranging a container in which the application is executed, in the node configuration output by the artificial intelligence module; and a recommendation result output unit configured to recommend a final node configuration in which validity verification by using the validity verification unit is successful, to the user.

The cluster node recommendation system may further include an output correction unit configured to direct output of a new node configuration to the artificial intelligence module when validity verification by using the validity verification unit has failed.

The cluster node recommendation system may further include a recommendation satisfaction collection unit configured to receive an approval signal of the final node configuration recommended by the recommendation result output unit and to store a result; and an output correction unit configured to direct output of a new node configuration to the artificial intelligence module when a disapproval signal is received by the recommendation satisfaction collection unit.

The recommendation satisfaction collection unit may match the recommended final node configuration, identification information of the application, whether or not approval is made, with each other and to store a result of matching in a result processing list.

The validity verification unit may check the result processing list and perform validity verification when the node configuration output by the artificial intelligence module and the application identification information are matched with each other.

The validity verification unit may determine, as a result of checking the result processing list, that validity has failed when a user disapproval ratio when the node configuration output by the artificial intelligence module and the application identification information are matched with each other, exceeds a preset ratio.

The validity verification unit may verify validity by arranging a container in which the application is executed, in the node configuration output by the artificial intelligence module only when validity verification by using the result processing list is successful.

The artificial intelligence module may perform machine learning periodically by using previously stored learning data, and when an amount of the previously stored learning data is less than a preset value, the cluster node recommendation system may further include a learning data expansion unit configured to expand virtual learning data by using the learning data, and the learning data expansion unit may determine expansion weights for each learning data based on information stored in the result processing list.

BRIEF DESCRIPTION OF THE DRAWINGS

FIG. 2 is a control flowchart illustrating a cluster node recommendation system according to an embodiment of the present invention.

DETAILED DESCRIPTION FOR CARRYING OUT THE INVENTION

Figure 1:
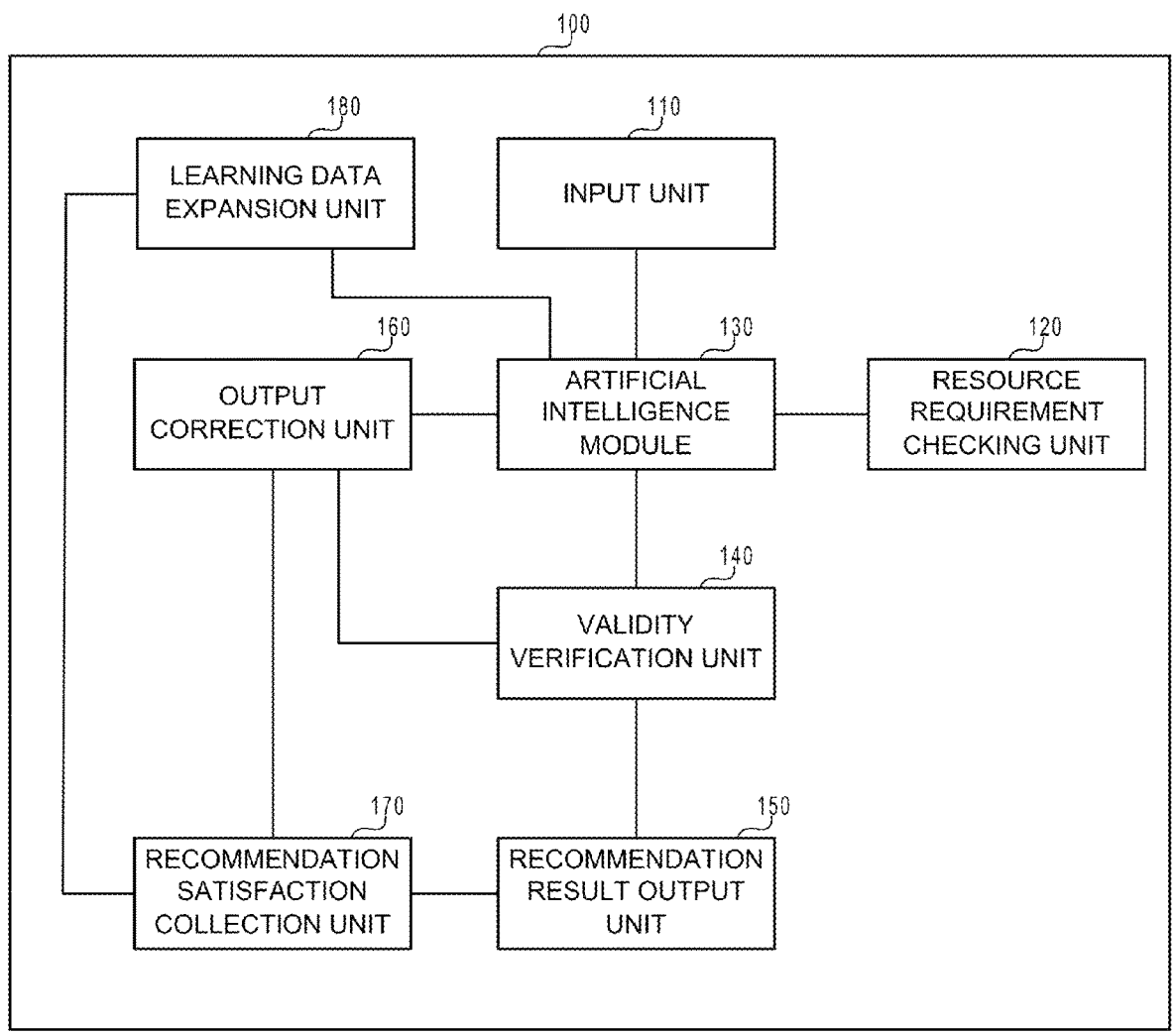
FIG. 1 is a functional block diagram of a cluster node recommendation system according to an embodiment of the present invention.

Hereinafter, the present invention will be described in detail with reference to the accompanying drawings.

An example of a detailed functional block of a cluster node recommendation system 100 according to an embodiment of the present invention is as illustrated in FIG. 1.

As illustrated in the same drawing, the cluster node recommendation system 100 may include an input unit 110, a resource requirement checking unit 120, an artificial intelligence module 130, a validity verification unit 140, a recommendation result output unit 150, an output correction unit 160, a recommendation satisfaction to collection unit 170, and a learning data expansion unit 180.

The input unit 110 performs a function in which user selection information is input to the input unit 110 from a user. Here, the user selection information that is information selected by the user about node resources to be driven by an application, and for example, at least one of cloud vendor information, an Information Technology (IT) resource size, and a free resource size may be included in the user selection information.

The cloud vendor information may be a designation of a specific vendor that the user prefers or wants among various cloud vendors that provide cluster node services. For example, this may be the name of the cloud vendor.

The IT resource size may be the user's designation of the number or size of IT resources (e.g., a central processing unit (CPU), a graphics processing unit (GPU), memory, and the like) to be allocated to a node configuration for application operation, and the free resource size is a designation of the free resource size of which a significant portion is maintained while the application operates.

The resource requirement checking unit 120 performs a function of checking resource requirements of the designated application.

For example, the user may designate a specific application for service provision. In this case, the resource requirement checking unit 120 performs a function of extracting and checking resource requirements matched and stored in the designated specific application.

In an example, resource requirements according to an application may be defined in the form of Yaml. Here, Yaml is a kind of a data serialization language that is often used to create a configuration file, and the format and using method thereof is a known technology and thus, more detailed descriptions thereof are omitted.

Here, the lowest or highest CPU utilization and lowest or highest memory utilization for each container in which the application is driven, may be stored in the resource requirements of the application.

Here, the container refers to an isolated area or structure for executing an application in a host operating system. Although the container is distinguished from a virtual machine that executes a complete operating system including a kernel, the container is the same as a virtual machine in that the container provides independent environments in which the application is executed.

In the present embodiment, the container is described as an example. However, the lowest or highest CPU utilization and lowest or highest memory utilization for each pod that is a basic unit (i.e., the distributable smallest computing unit that may be created and managed in Kubernetes.) may be stored in Kubernetes environments.

Here, a pod is a collection of one or more of the above-mentioned containers, and is the minimum unit of a Kubernetes application, and there may be a pod including several tightly coupled containers, or a pod including only a single container.

That is, when an application operates based on Kubernetes, limits or requests of the CPU and the memory of a pod according to an application may be stored in the above-described Yaml, and the resource requirement checking unit 120 may check the resource requirements of the application by reading Yaml matched with the application.

If the resource requirements corresponding to the application are not checked, the resource requirement checking unit 120 may also regard a preset default value as resource requirements of the application.

The artificial intelligence module 130 performs a function in which the user selection information input to the input unit 110 and the resource requirements of the application checked by the resource requirement checking unit 120 are input to the artificial intelligence module 130 and a node configuration is output.

Here, the 'node configuration' output by the artificial intelligence module 130 refers to information about a node suitable for executing an application (configuration information, node product name, etc.), where the node refers to a machine on which the above-described pod operates.

That is, in an example of Kubernetes, a pod always operates on a node, and the node refers to a worker machine in Kubernetes and may be a virtual or physical machine according to clusters.

Cloud vendors offer various 'node configurations' and provide services and charge fees according to the 'node configuration' selected by the user.

That is, in the present embodiment, the 'node configuration' may refer to a node product name, node information (CPU, memory, storage, cost), or the like.

In order to perform the above-described functions, the artificial intelligence module 130 may perform machine learning by using predetermined learning data. In case of supervised learning, user selection information and resource requirements may be input, and the 'node configuration' may be a labeled output value.

The supervised learning procedure itself is a known technology and thus, more detailed descriptions thereof are omitted.

However, the artificial intelligence module 130 may periodically perform machine learning by using such learning data. As machine learning progresses, the completion of the artificial intelligence module 130 increases.

In particular, in the present embodiment, the artificial intelligence module 130 may perform processing linked to a Particle Swarm Optimization (PSO) algorithm, compare the size of resources across nodes and the total of pod resources, and search for minimum cost combination.

PSO is an iterative optimization algorithm that attempts to simulate social behavior, which is was developed by Dr. Eberhart and Dr. Ennedy, and the content of the algorithm itself is a known technology, more detailed descriptions are omitted.

The validity verification unit 140 performs a function of verifying validity by arranging a container in which an application is executed, in the node configuration output by the artificial intelligence module 130. In case of Kubernetes, the validity verification unit 140 may verify validity by arranging a pod in which the application is executed, in the node configuration output by the artificial intelligence module 130.

Here, verifying validity by arranging the pod in the node configuration, means determining whether a problem occurs when the pod is logically configured and operates in the node configuration, and this has the effect of filtering out incorrect node configurations by testing the node configurations in advance before operating the actual application.

In addition, the validity verification unit 140 may perform more various functions, and more detailed descriptions thereof will be additionally provided after descriptions of other components are completed.

The recommendation result output unit 150 may perform a function of recommending a final node configuration with validity verification success by using the validity verification unit 140, to the user.

That is, the recommendation result output unit 150 may provide and recommend information about a node product name, a CPU, memory, a storage etc. included in the node that is the 'node configuration' output by the artificial intelligence module 130.

Meanwhile, the recommendation satisfaction collection unit 160 may perform a function of receiving whether or not an approval signal of the final node configuration recommended by the recommendation result output unit 150 from the user and storing the result of approval.

For example, the recommendation satisfaction collection unit 170 may match the recommended final node configuration, identification information of the application, the approval result with each other and may store the result of matching in a result processing list.

In an example, the recommendation satisfaction collection unit 170 may match the product name of the node recommended by the recommendation result output unit 150, an application name (including version information), whether or not approval with each other and may store the result of matching in the result processing list.

Here, whether or not approval may be determined based on an approval signal transmitted when the recommended node configuration is satisfactory and a disapproval signal transmitted when the recommended node configuration is not satisfactory.

For example, when the user determines, based on his or her own experience, that there was a problem with the node configuration recommended for the current application, the user may transmit a disapproval signal.

The output correction unit 160 performs a function of directing output of a new node configuration to the artificial intelligence module 130 when validity verification by using the validity verification unit 140 has failed.

That is, the output correction unit 160 requests another 'node configuration' to the artificial intelligence module 130 when it is determined that the pod cannot normally operate in the corresponding node configuration even when the artificial intelligence module 130 primarily outputs the 'node configuration'.

In addition, as described above, the recommendation satisfaction collection unit 170 may receive an approval signal or a disapproval signal from the user, and the output correction unit 160 may direct output of a new node configuration to the artificial intelligence module 130 when the disapproval signal is received by the recommendation satisfaction collection unit 170.

That is, since the node configuration is rejected by the user, the output correction unit 160 controls the artificial intelligence module 130 so that a new 'node configuration' can be made.

Meanwhile, the validity verification unit 140 described above may also perform validity verification when, as the result of checking the result processing list, the node configuration output by the artificial intelligence module 130 and the application identification information are matched with each other.

For example, the validity verification unit 140 may determine that validity has failed when, as the result of checking the result processing list, the user's disapproval ratio when the node configuration output by the artificial intelligence module 130 and the application identification information are matched with each other, exceeds a preset ratio.

That is, when a node configuration B is output by the artificial intelligence module 130 for a specific application A and the disapproval ratio in the result processing list for A:B matching is high, this means that the matching is often rejected by the user, so that the validity verification unit 140 determines that the validity has failed.

The validity verification unit 140 may perform a process of verifying validity by arranging a container in which an application is executed, in the node configuration output from the artificial intelligence module 130 only when validity verification using the above-mentioned result processing list is successful.

That is, validity verification performed by the validity verification unit 140 can be divided into two stages. That is, first stage validity verification is validation based on the result processing list, and second stage validity verification is validation through container (pod) arrangement. The validity verification unit 140 performs second stage validity verification only when first stage validity verification is successful.

Thus, when first stage validity verification has failed, the user can immediately request another node configuration to the artificial intelligence module 130 without performing second stage validity verification, thereby preventing waste of time and resources required to perform second stage validity verification.

The learning data expansion unit 180 performs a function of expanding virtual learning data by using learning data when the amount of previously stored learning data is less than a preset value.

As mentioned above, in order to continuously improve the completeness of the artificial intelligence module 130, machine learning needs to be performed periodically. In this case, as the amount of the provided learning data increases, the completeness of the artificial intelligence module 130 increases rapidly, so that the learning data expansion unit 180 generates virtual learning data and allows the artificial intelligence module 130 to learn along with existing learning data.

For example, when the resource requirements of the application and the user selection information are matched with the learning data with the node product name as the node configuration, the learning data expansion unit 180 may generate virtual learning data in which other information are left as they are and 5%, 10% and 15% of the memory size of the resource requirements have increased.

In particular, the learning data expansion unit 180 may determine expansion weights for each learning data by using information stored in the result processing list.

For example, the learning data expansion unit 180 may generate only three virtual learning data for those matched as 'disapproved' in the result processing list among the learning data, and may generate 10 virtual learning data for those matched as 'approved' in the result processing list among the learning data.

Hereinafter, a control flow of main functions of the cluster node recommendation system 100 according to an embodiment will be described with reference to FIG. 2.

The cluster node recommendation system 100 receives user selection information (operation S1), for example, information about a cloud vendor name, IT resource size, and free resource size from the user.

Subsequently, the cluster node recommendation system 100 checks the resource requirements of the application (operation S3), for example, by extracting Yaml of the corresponding application.

The cluster node recommendation system 100 may input the user selection information and the resource requirements of the application to the artificial intelligence module 130 so that the 'node configuration' can be output (operation S5).

Subsequently, the cluster node recommendation system 100 checks whether validity verification is successful by arranging a pod in the output 'node configuration' (operation S7).

As a result of checking, when validity verification is successful (operation S7), the cluster node recommendation system 100 recommends a final node configuration to the user (operation S9).

If, as a result of checking, validity verification has failed (operation S7), the cluster node recommendation system 100 may control the artificial intelligence module 130 to output another node configuration (operation S5), and this procedure may be repeatedly performed.

Meanwhile, it is obvious that the procedure of performing embodiments described above may be performed by a program or an application stored in a certain recording (e.g., a computer-readable) medium. Here, examples of the recording medium include an electronic recording medium such as random access memory (RAM), a magnetic recording medium such as a hard disk, an optical recording medium such as a compact disk (CD), and the like.

In this case, the program stored in the recording medium may be executed on hardware such as a computer or a smartphone so that embodiments described above can be performed. In particular, at least one of functional blocks of the cluster node recommendation system 100 according to the present invention described above may be implemented by the program or application.

As described above, according to the present invention, an optimum node configuration required by an application can be easily selected by a user so that user satisfaction can be increased.

In particular, in case of a Kubernetes system, since a Kubernetes cluster is configured with optimum resources required by the application, the effects of stable service quality in public cloud environments and cost reduction can be expected.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A cluster node recommendation system comprising:
an input unit to which user selection information is input from a user, the user selection information including at least one of a cloud vendor, an Information Technology (IT) resource size, and a free resource size;
a resource requirement checking unit configured to check resource requirements of a designated application;
an artificial intelligence module to which the user selection information input to the input unit and the resource requirements of the application checked by the resource requirement checking unit are input and which outputs a node configuration;
a validity verification unit configured to verify validity by arranging a container in which the application is executed, in the node configuration output by the artificial intelligence module;
a recommendation result output unit configured to recommend a final node configuration in which validity verification by using the validity verification unit is successful, to the user;
a recommendation satisfaction collection unit configured to receive an approval signal of the final node configuration recommended by the recommendation result output unit and then to match the recommended final node configuration, identification information of the application, whether or not approval is made, with each other and to store a result of matching in a result processing list;
an output correction unit configured to direct output of a new node configuration to the artificial intelligence module when a disapproval signal is received by the recommendation satisfaction collection unit;
wherein the validity verification unit checks the result processing list and performs validity verification when the node configuration output by the artificial intelligence module and the application identification information are matched with each other; and
wherein the validity verification unit checks the result processing list and determines that validity has failed when a user disapproval ratio of the node configuration output by the artificial intelligence module and the application identification information are matched with each other, exceeds a preset ratio; and
the artificial intelligence module performs machine learning periodically by using previously stored learning data,
when an amount of the previously stored learning data is less than a preset value, the cluster node recommendation system further comprises a learning data expansion unit configured to expand virtual learning data by using the learning data, and
the learning data expansion unit determines expansion weights for each learning data based on information stored in the result processing list.

2. The cluster node recommendation system of claim 1, further comprising the output correction unit configured to direct output of the new node configuration to the artificial intelligence module when validity verification by using the validity verification unit has failed.

3. The cluster node recommendation system of claim 1, wherein the validity verification unit verifies validity by arranging a container in which the application is executed, in the node configuration output by the artificial intelligence module only when validity verification by using the result processing list is successful.

* * * * *